United States Patent Office 3,770,711
Patented Nov. 6, 1973

3,770,711
ORIENTED STRUCTURES OF TETRAFLUORO-ETHYLENE/PERFLUORO (ALKYL VINYL ETHER) COPOLYMER
Martval John Hartig and John Edward Hansen, Wilmington, Del., assignors to E. I. du Pont de Nemours and Company, Wilmington, Del.
No Drawing. Filed Jan. 31, 1972, Ser. No. 222,330
Int. Cl. C08f 15/02, 47/22
U.S. Cl. 260—87.5 A
7 Claims

ABSTRACT OF THE DISCLOSURE

Oriented structures of tetrafluoroethylene/perfluoro (alkyl vinyl ether) copolymers, in which the alkyl group contains from 1 to 5 carbon atoms and the copolymer contains from 1.0 to 7% by wt. of the ether monomer, exhibit unexpectedly high long-term load-bearing ability as well as other improved properties over similarly oriented structures of commercially available tetrafluoroethylene/hexafluoropropylene copolymer.

---

This invention is directed to oriented structures of certain tetrafluoroethylene/perfluoro(alkyl vinyl ether) copolymers.

Copolymers of tetrafluoroethylene and hexafluoropropylene are disclosed in U.S. Patent No. 2,946,763 to Bro and Sandt. These copolymers represent the only commercially available high molecular weight melt fabricable perfluorocarbon polymer("Teflon" FEP-fluorocarbon resin). These copolymers possess some of the property advantages, e.g., chemical resistance and good dielectric properties, of polytetrafluoroethylene together with the advantage of melt fabricability by such conventional processes as melt extrusion or injection molding, which is not possessed by the homopolymer which has a specific melt viscosity in excess of $1 \times 10^9$ poises at 380° C.

Among the uses of these copolymers is their formation into oriented structures such as films, heat shrinkable tubing and filaments as described in such patents as U.S. Patent 2,776,465; 3,426,118; Re 27,028, and 3,500,870. While oriented structures of these copolymers have achieved widespread use, there remains a need for improvement of the load-bearing capability of the oriented structure at elevated temperatures.

Copolymers of halo(alkyl vinyl ethers) and tetrafluoroethylene are disclosed in U.S. Pat. Nos. 3,159,609; 3,180,895; and 3,132,123, all to Harris and McCane.

It has been discovered that oriented structures of tetrafluoroethylene/perfluoro(alkyl vinyl ether) copolymer, in which the alkyl group contains 1 to 5 carbon atoms and the ether comonomer constitutes from 1.0 to 7 wt. percent of the copolymer, possess unexpectedly high load bearing ability as compared to commercially available tetrafluoroethylene/hexafluoropropylene copolymer.

By way of illustration, filaments of tetrafluoroethylene/hexafluoropropylene copolymer and tetrafluoroethylene/perfluoro(propyl vinyl ether) copolymer measuring (dia.) 29 mils (0.74 mm.) and 28 mils (0.71 mm.), respectively, were drawn 340% (gauge length 5.08 cm.) of their original length at 30° C. using a tensile testing machine to do the drawing and equipped with an oven to heat the filaments to the draw temperature. The drawn filaments were cooled to room temperature while held in their drawn length. The filaments upon release from the testing machine exhibited a small instantaneous recovery such that after this recovery, the length of their drawn region was about 300% of the original length of the region before drawing. This represents an orientation ratio of about 3 (length of oriented structure after permitting instantaneous recovery÷original length). To test the load bearing characteristics of the oriented filaments of the tetrafluoroethylene/hexafluoropropylene copolymer, separate lengths of the filament were loaded with progressively increasing weights. The loaded filaments were placed in a hot air oven operating at 100° C., and the period of time that the filament maintained its load without breaking was observed, as follows:

| Load (stress) on filament-kg./cm.$^2$ | Time to break |
|---|---|
| 496 | Several seconds. |
| 425 | Two minutes. |
| 354 | Several seconds. |
| 283 | Five minutes. |

The filaments of tetrafluoroethylene/perfluoro(alkyl vinyl ether) copolymer were subjected to the same load-bearing test at stresses of 496 and 425 kg./cm.$^2$, and in each instance the filament did not break after 1100 hours residence in the hot oven. This comparison shows the superiority of the load-bearing capability of oriented structures of the present invention as compared to commercially available tetrafluoroethylene/hexafluoropropylene copolymers at elevated temperatures, e.g., 100° C.

Filament of the same tetrafluoroethylene/perfluoro (alkyl vinyl ether) copolymer was drawn 340% at 200° C. and subjected to the same load bearing test; after 1100 hours in the hot oven, the filament had crept only about 5%, indicating outstanding creep resistance.

To illustrate the improved load-bearing capability of oriented structures of the present invention at room temperatures, filaments of the above copolymers were oriented and load tested as described above except that the loaded filaments were not heated. The results were as follows:

| | Time to break | |
|---|---|---|
| Load (Stress) on Filament, kg./cm.$^2$ | Tetrafluoroethylene/ perfluoro(propyl vinyl ether) copolymer [1] | Tetrafluoroethylene/ hexafluoropropylene copolymer |
| 496 | 800+ hours | Several seconds. |
| 425 | do | Do. |
| 354 | do | 1 to 2 hours. |
| 283 | do | Do. |

[1] None of the filaments broke after 800 hours of loading.

This improved load bearing capability and resistance to creep enables the filament and the other oriented structures of the present invention to be used in such applications as woven screens for filtration and in pads for mist elimination under greater temperature and load conditions than heretofore possible with filament of commercially available tetrafluoroethylene/hexafluoropropylene copolymer.

The tetrafluoroethylene/hexafluoropropylene copolymer used in the foregoing illustrations was a commercially available "Teflon" FEP-fluorocarbon resin having a specific melt viscosity of $8 \times 10^4$ poises at 372° C. and a melting point of about 270° C. The tetrafluoroethyl/perfluoro(propyl vinyl ether) used contained 3% by wt. of perfluoro(propyl vinyl ether); and had a specific melt viscosity of $27 \times 10^4$ poises at 372° C. In contrast to this low comonomer content, the hexafluoropropylene content of the tetrafluoroethylene/hexafluoropropylene copolymer was more than four times as great in order for the copolymer to have optimum properties together with melt fabricability. The specific melt viscosities disclosed herein are determined at the temperatures named herein at a shear stress of $4.5 \times 15^5$ dynes/cm.$^2$ by the procedure disclosed in U.S. Pat. No. 2,946,763.

Similar high temperature load-bearing capability is exhibited by oriented structures of tetrafluoroethylene/perfluoro(methyl, ethyl, butyl, or amyl vinyl ether) copolymer within the 1.0 to 7% by wt. range of ether monomer content and at perfluoro(propyl vinyl ether) contents within this range other than the 3% by wt. illustrated. For thermal stability purposes, the alkyl group of the ether monomer should be straight chain in structure. For optimum results, larger proportions of the ether monomer containing the smaller alkyl groups and smaller proportions of the ether monomer containing larger alkyl groups are used within the 1 to 7 wt. percent range. The preferred ether monomer content of the copolymer is 1.5 to 5% by wt. and the preferred ether monomers are those in which the alkyl group contains from 2 to 4 carbon atoms. The monomer contents stated herein refer to the units derived from the monomer by copolymerization. The copolymers are high molecular weight and melt fabricable as indicated by their having a specific melt viscosity of $1 \times 10^3$ to $1 \times 10^7$ poises at 372° C. and preferably from $1 \times 10^4$ to $1 \times 10^6$ poises at 372° C. Typically, the copolymer will have a melting point of at least 290° C. Melting points disclosed herein are determined by differential thermal analysis using a copolymer sample size of 1 mg. and a slow heating rate, i.e., less than 20° C. per min. The melting point is the point of complete melting on the DTA curve; the point can be determined as the point of intersection of a line drawn tangent to the high temperature side of the peak with the base line of the DTA curve. The copolymers can be prepared by the copolymerization procedures disclosed in U.S. Pat. Nos. 3,132,123; 3,528,954, or 3,635,926.

The copolymers can be fabricated into orientable structures by conventional means applicable to the particular form of the structure desired. The orientable structures can be characterized by a small thickness dimension and a long length, examples including film such as sheeting and ribbon and funicular structures such as tubing, beading and filament.

The structures are oriented by conventional means applicable to the form of the structure. Thus, spaced pairs of nip or draw rolls operating at increasing speeds can be used to draw filament and ribbon of the copolymer; tenter frame equipment can be used to draw film; and tubing of the copolymer can be radially expanded against the interior wall of a pipe of larger diameter to form heat shrinkable tubing of the copolymer. In all cases, the orientation is conducted at a temperature which is less than the melting point of the copolymer from which the structure being oriented is made, whereby a degree of alignment of the molecules of the structure occurs, which is not present in the structure prior to orientation.

In the case where the drawing is conducted at elevated temperatures, the structure is maintained in the drawn condition until cooled sufficiently, usually to room temperature (20-25° C.) to freeze the structure in the oriented state.

Upon release of the oriented structure from the drawing equipment, some instantaneous recovery (snap back) of the oriented structure towards its original length occurs. For the same degree of draw, the degree of instantaneous recovery tends to decrease with increasing draw temperature. The degree of instantaneous recovery also tends to increase with the increase in draw. Typically, an orientation ratio of at least 1.1 is required before the benefits of orientation are realized. For some applications, an orientation ratio of at least 2 is desired for oriented structures of the present invention. With the proper selection of draw conditions, i.e., temperature and rate, draws in excess of 400% and thus high orientation ratios can be achieved.

The greater the draw temperature, the greater is the amount of draw and faster is the draw rate that can be achieved without rupture of the oriented structure. The tetrafluoroethylene/perfluoro(alkyl vinyl ether) copolymers oriented in the present invention have the advantage of being drawable at much higher temperatures and thus at greater draw rates than structures of commercially available tetrafluoroethylene/hexafluoropropylene copolymer. For example, the tetrafluoroethylene/perfluoro (propyl vinyl ether) copolymer specifically described hereinbefore can be rapidly drawn to a high degree of elongation at a temperature of 240° C., whereas commercially available tetrafluoroethylene/hexafluoropropylene copolymer when drawn to a high degree of elongation at temperatures greater than 100–150° C. must be drawn slowly.

The oriented structures of the present invention also have the advantage of improved shrinkage tension over commercially available tetrafluoroethylene/hexafluoropropylene copolymer. To illustrate, films 5.08 cm. long (gauge length), 2.54 cm. wide and 0.51 mm. thick of commercially available tetrafluoroethylene/hexafluoropropylene copolymer and the tetrafluoroethylene/perfluoro(propyl vinyl ether) copolymer (3% by wt. ether monomer) were stretched in a tensile tester at a draw rate of 5.08 cm. per min. and oven temperature of 130° C. until an elongation of 40% was obtained. The films were cooled to room temperature while in this drawn state and released from the jaws of the tester to permit the films to snap back. The resultant orientation ratios were 1.36 and 1.29 for the hexafluoropropylene and ether-containing copolymers, respectively. The films were then reinserted in the tester jaws within the tester oven and the jaws were positioned to just take out any slack in the film. The drawing oven was then reheated at a rate of 2.5° C. per min. and as the temperature rose the following load values were read from the tester for the respective films:

| | Load, kg. | |
|---|---|---|
| Temperature, °C. | Tetrafluoroethylene/ hexafluoropropylene copolymer film | Tetrafluoroethylene/ perfluoro(propyl vinyl ether) copolymer film |
| 60 | 1.14 | 1.59 |
| 90 | 3.05 | 3.54 |
| 110 | 3.46 | 4.27 |
| 130 | 3.58 | 4.52 |
| 150 | 3.48 | 4.71 |
| 180 | 2.64 | 4.04 |
| 210 | 1.84 | 3.34 |
| 240 | 0.97 | 2.44 |
| 270 | 0.03 | 1.41 |

These results show the greater residual stress or shrinkage tension of the tetrafluoroethylene/perfluoro(propyl vinyl ether) copolymer film especially as the temperature increases. The load required to draw the latter film is greater than required to draw the former film and this greater load requirement is recovered upon reheating the films. This property is especially valuable in applications involving envelopment of an object, the improved shrinkage tension providing a tighter envelopment.

Even greater improvement is exhibited by oriented structures in filament form. Extruded, nonoriented filament of the copolymers of the preceding paragraph were made in a typical spinning setup. The hexafluoropropylene-containing copolymer filament was 29 mils in diameter and the ether monomer-containing copolymer filament (5.08 cm. gauge length) was 28 mils in diameter. Each of these filaments was drawn 100 percent at 150° C. on a tensile tester equipped with an oven. The maximum stress required to draw the filaments, as determined from the load reading on the machine was 85 kg./cm.$^2$ and 134 kg./cm.$^2$ for the hexafluoropropylene-containing copolymer and the ether monomer-containing copolymer, respectively.

The filaments were cooled to ambient temperature while under tension. They were then relaxed 10 percent to give a slack filament in the tester jaw. The orientation ratio for each filament was 1.8. Their diameters after relaxation were 21.5 mils and 20 mils for the hexafluoropropylene-containing copolymer and the ether monomer-containing copolymer, respectively. At this time, the oven was closed and allowed to heat up as fast as the heaters in the oven would allow, starting at a heating rate in excess of 50° C./minute and ending at a heating rate of about 4° C./minute at 220° C. During this heatup, the load values indicated on the tester were recorded as follows:

| | Shrinkage tension (load), gm. | |
|---|---|---|
| | Tetrafluoroethylene/ hexafluoropropylene copolymer | Tetrafluoroethylene/ perfluoro(propyl vinyl ether) copolymer |
| 110 | 53.5 | 126.9 |
| 120 | 63.5 | 145.0 |
| 140 | 72.5 | 149.5 |
| 160 | 86.2 | 158.5 |
| 180 | 90.7 | 163.0 |
| 200 | 77.0 | 154.0 |
| 220 | 68.0 | 145.0 |

To illustrate the shrinkage characteristics of oriented structures of the present invention, films (5.08 cm. gauge length, 2.54 cm. wide, and 0.51 mm. thick) of the specific tetrafluoroethylene/perfluoro(propyl vinyl ether) copolymer described hereinbefore were subjected to varying degrees of draw at different temperatures by a tensile tester, cooled to room temperature and released from the tester to permit snap back, and then reheated at various temperatures to determine the shrinkage ratio of the film (drawn length after snap back ÷ shrunken length), to give the following results:

| Draw conditions | | Shrinkage ratio at— | | |
|---|---|---|---|---|
| Temp., °C. | Draw, percent | 130° C. | 180° C. | 250° C. |
| 130 | 40 | 1.19 | 1.22 | 1.22 |
| 130 | 100 | 1.41 | 1.48 | 1.52 |
| 130 | 250 | 1.28 | 1.54 | 1.94 |
| 180 | 40 | 1.17 | 1.22 | 1.23 |
| 180 | 100 | 1.21 | 1.44 | 1.58 |
| 180 | 250 | 1.12 | 1.30 | 1.61 |

This oriented film can be formed into a tubular shape and the butting edges heat bonded to one another to form heat shrinkable tubing that will shrink radially upon heating, to envelop an object. Alternatively, the copolymer can be extruded as tubing and the tubing radially expanded to form tubing that will radially shrink upon later application of heat.

As many apparently widely different embodiments of this invention may be made without departing from the spirit and scope thereof, it is to be understood that this invention is not limited to the specific embodiments thereof except as defined in the appended claims.

What is claimed is:

1. Oriented structure of tetrafluoroethylene/perfluoro-(alkyl vinyl ether) copolymer, the alkyl group containing 1 to 5 carbon atoms, the perfluoro(alkyl vinyl ether) monomer being 1.0 to 7% by wt. of the copolymer, the orientation ratio of said oriented structure being at least 1.1.

2. The oriented structure of claim 1 in the form of film.

3. The oriented structure of claim 1 in the form of tubing.

4. The oriented structure of claim 1 in the form of a funicular structure.

5. The oriented structure of claim 1 wherein the alkyl group contains 2 to 4 carbon atoms.

6. The oriented structure of claim 5 wherein the proportion of said monomer is 1.5 to 5% by wt. of the copolymer.

7. The oriented structure of claim 1 in the form of filament.

References Cited
UNITED STATES PATENTS

| 2,776,465 | 1/1957 | Smith | 28—82 |
| 3,132,123 | 5/1964 | Harris et al. | 260—87.5 |
| 3,159,609 | 12/1964 | Harris et al. | 260—87.5 |

JOSEPH L. SCHOFER, Primary Examiner

S. M. LEVIN, Assistant Examiner

Disclaimer 3,770,711.—*Martval John Hartig* and *John Edward Hansen*, Wilmington, Del. ORIENTED STRUCTURES OF TETRAFLUOROETHYLENE/PERFLUORO (ALKYL VINYL ETHER) COPOLYMER. Patent dated Nov. 6, 1973. Disclaimer filed Aug. 26, 1977, by the assignee, *E. I. du Pont de Nemours and Company*.

Hereby enters this disclaimer to claim 3 of said patent.

[*Official Gazette October 18, 1977.*]